United States Patent [19]

Owen et al.

[11] Patent Number: 4,725,993
[45] Date of Patent: Feb. 16, 1988

[54] DEVICE INCLUDING BATTERY-ACTIVATED OSCILLATOR

[75] Inventors: Charles W. Owen; Roberto A. Garcia, both of Miami, Fla.

[73] Assignee: Elexis Corporation, Miami, Fla.

[21] Appl. No.: 28,718

[22] Filed: Mar. 20, 1987

[51] Int. Cl.$^4$ .......................... H04B 1/02; H03K 3/26
[52] U.S. Cl. .................................. 367/139; 331/111; 340/384 E
[58] Field of Search .................... 367/139; 340/384 E; 331/111, 143; 116/22 A

[56] References Cited

U.S. PATENT DOCUMENTS 4,669,424 6/1987 Bianco et al. ...................... 367/139

Primary Examiner—Thomas H. Tarcza
Assistant Examiner—Ian J. Lobo
Attorney, Agent, or Firm—Lowe, Price, LeBlanc, Becker & Shur

[57] ABSTRACT

A low duty cycle relaxation oscillator periodically gates an ultrasonic frequency relaxation oscillator into an on state. The ultrasonic frequency oscillations are supplied to an electric-compressional wave transducer by way of a push-pull driver. The duty cycle and repetition rate of the relaxation oscillator and the ultrasonic oscillation frequency are such that compressional waves derived by the transducer incident on fleas in the region where the transducer is located repels the fleas. All active elements in the oscillator and driver are CMOS devices which draw only leakage current while in quiescent bi-level states and through current from a battery during transitions between the bi-level states. The drain from the battery is reduced by connecting a high impedance between the battery and the CMOS devices during a relaxation oscillator transition.

18 Claims, 5 Drawing Figures

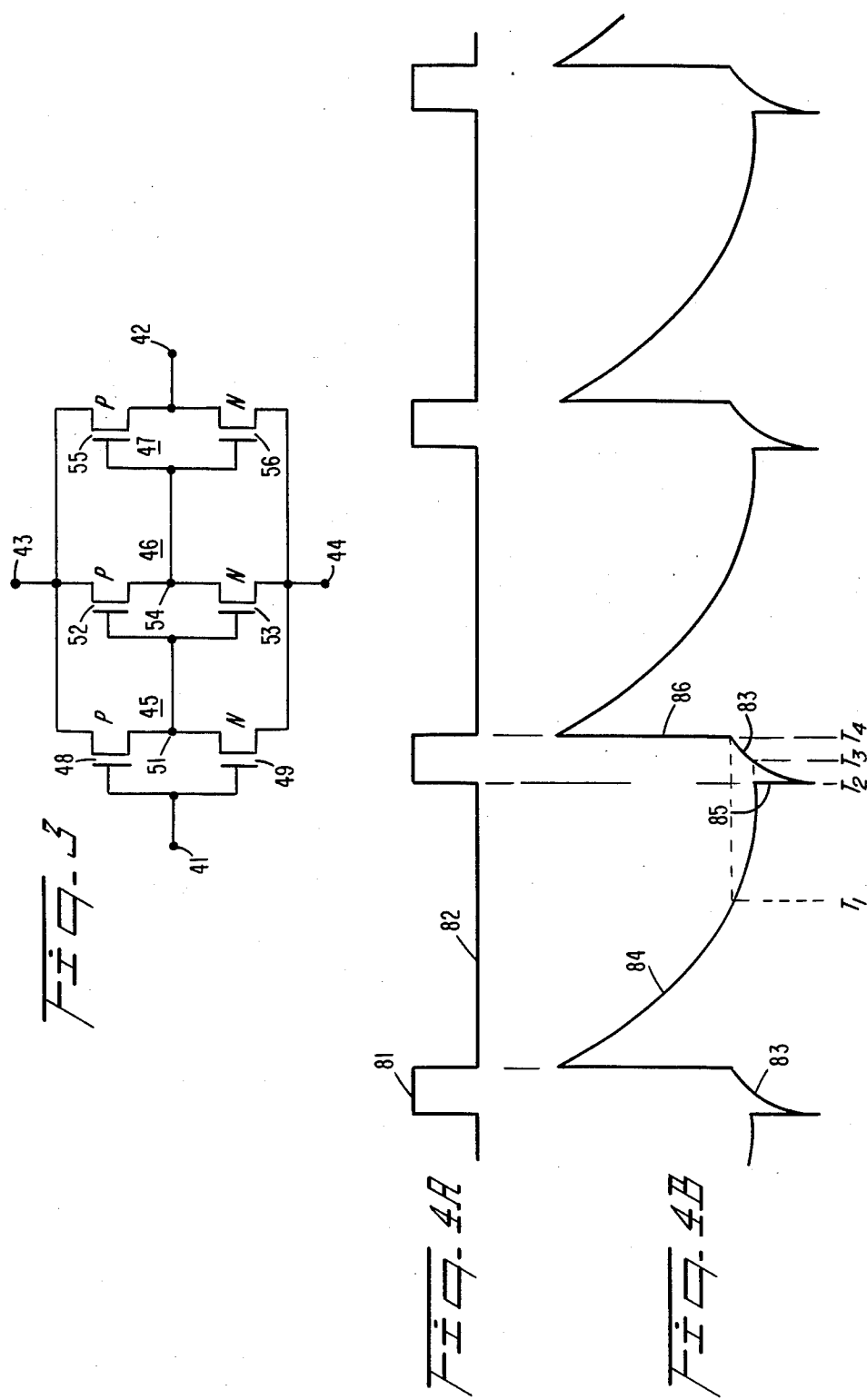

DEVICE INCLUDING BATTERY-ACTIVATED OSCILLATOR

TECHNICAL FIELD

The present invention relates generally to battery-powered relaxation oscillator circuits employing active elements that draw only leakage current when in quiescent bi-level states and which draw increased current while undergoing transitions between the states and more particularly to such a circuit that provides a relatively high impedance between the active elements and the battery while transitions between the states are occurring to reduce current drawn from the battery.

BACKGROUND ART

Certain devices, particularly complementary metal oxide semiconductor (CMOS) transistors, have very low power requirements while in stable bi-level states, but draw substantial through current while undergoing transitions between the states. These well known CMOS characteristics are described in numerous publications, for example the National Semiconductor Corporation Handbook entitled MM54HC/74HC *High-Speed CMOS Family Databook*. Because of these characteristics, CMOS devices have been used in the past in portable devices having low output power requirements from batteries over long time intervals, such as six months. For example, CMOS circuitry is employed in the relaxation oscillator of a commercial flea repelling device, basically disclosed in the co-pending, commonly assigned application of Bianco et al, Ser. No. 742,232, filed June 7, 1985 now U.S. Pat. No. 4,669,424.

The flea repelling device includes a low duty cycle relaxation oscillator including CMOS gating devices which drive an ultrasonic frequency oscillator through a CMOS gate. The oscillator is connected to a electric-compressional wave transducer. The low frequency and duty cycle, as well as the ultrasonic frequency supplied to the transducer, cause compressional waves to be emitted by the transducer. The compressional waves incident on the fleas repel the fleas. The oscillators and gate are powered by a pair of series-connected batteries, preferably lithium cells, which have a life of about six months. The prior art device is mounted in a housing carried by a collar on a domestic animal, such as a dog or a cat, from which fleas are to be repelled. The ultrasonic compressional waves derived by the transducer are reflected from the ground beneath the animal back to the body of the animal. While the prior art device has functioned admirably for its intended purpose, it is desirable to reduce the power requirements of the device, to reduce the size and weight of the housing and its contents, as well as to increase the life of the battery.

It is, accordingly, an object of the present invention to provide a new and improved portable, battery-powered oscillating device having low input power requirements.

Another object of the present invention is to provide a new and improved portable, battery-powered oscillating device having long life even though it uses batteries of small size and energy ratings.

A further object of the invention is to provide a new and improved portable electronic flea repelling device for emitting compressional waves with appreciably smaller energy battery requirements than prior art devices for the same purpose.

A problem in the manufacture of the prior art commercial electronic flea collar is that it is very component sensitive. If certain components, particularly the transducer, originate from different supplies, the circuit must frequently be redesigned to enable oscillations at the optimum ultrasonic frequency to be obtained. Different transducers have different characteristics and impedances and provide different impedance matches to the driving circuit. It has been found that this problem arises because the transducer is connected in a feedback circuit that is part of the ultrasonic frequency oscillator.

It is, therefore, a further object of the invention to provide a new and improved portable electronic flea repelling device having high efficiency, and is not particularly component sensitive.

A further object of the invention is to provide a new and improved electronic flea repelling device wherein electric-compressional wave transducers from different suppliers can be employed without any redesign of the circuitry which drives the transducer.

DISCLOSURE OF INVENTION

In accordance with the present invention, current supplied to a relaxation oscillator containing CMOS inverters is attenuated at the time a state transition of the inverter is occurring. The attenuation is provided by connecting a high impedance in series with power supply terminals of CMOS transistors in the inverter during the transition.

In one particular aspect of the invention, an apparatus for periodically supplying a pulsating waveform to a load from a portable, low energy battery comprises a relaxation oscillator for deriving the pulsating waveform. The oscillator includes a pair of CMOS inverters connected in a feedback circuit including resistor and capacitor means so that exponential charge and discharge voltage waveforms are applied to an input of one of the inverters. A pair of complementary CMOS transistors in the inverter have source drain paths connected in series with terminals of the battery. The transistors include gate electrodes responsive to the exponential waveform voltage that in response to the exponential waveform voltage being in a predetermined range between minimum and maximum values of the battery voltage, both transistors are simultaneously forward biased and there is a tendency for substantial through current to flow simultaneously through both source drain paths. A sudden transition in the output of the one inverter occurs in response to the exponential waveforms passing through the predetermined range. In response to the inverter output, a current limiting impedance is connected in series with the source drain paths and the battery terminals at the time the substantial current has a tendency to flow to substantially attenuate the magnitude of the through current without substantially affecting the derivation of the sudden transitions.

In accordance with a further aspect of the invention, a portable, battery-powered flea repelling device includes a relaxation oscillator for deriving pulses having a predetermined duty cycle and a predetermined frequency. A gated ultrasonic frequency oscillator gated on by the pulses drives an ultrasonic electric-to-compressional wave transducer. The duty cycle, pulse frequency and ultrasonic frequency are such that compressional waves derived from the transducer repel fleas from the region where the transducer is located. Active elements in the relaxation oscillator and gated oscillator draw substantial current from the battery only while undergoing state transitions between bi-level outputs thereof. In response to the pulses derived by the relaxation oscillator a current limiting impedance is connected in series with the active elements and electrodes of the battery while transitions in the relaxation oscillator occur to substantially attenuate the magnitude of the current drawn by the actibe elements during the transitions. The ultrasonic oscillations with the current limiting impedance connecting means as a part of the device are substantially the same as the ultrasonic oscillations without the current limiting means as part of the device.

To assist in providing the desired component insensitivity, the ultrasonic frequency oscillator is coupled via a push-pull driver to the transducer. The push-pull driver includes a pair of inverters containing the same type of active elements as included in the gated and relaxation oscillators.

In accordance with still another aspect of the invention, an apparatus for deriving periodic pulses, each including high frequency oscillations, comprises a low energy battery, a low frequency relaxation oscillator powered by the battery for deriving pulses having a low duty cycle, i.e., less than 30%, and a gated high frequency oscillator powered by the battery to be responsive to the pulses for deriving the oscillations only while the pulses are being derived. The relaxation and gated oscillators include active elements having a low impedance for current from the battery during transitions between high and low fixed states thereof and a high impedance for current from the battery while in the high and low fixed states. The active elements of the relaxation and gated oscillators respectively change states at the high and low frequencies. The relaxation and high frequency oscillations are arranged so that transitions between the fixed states of the low frequency oscillator tending to provide the low impedance are relatively long and transitions between the fixed states of the high frequency oscillator tending to provide the low impedance are relatively short. In response to a waveform derived by the relaxation oscillator a current limiting impedance is connected between the battery and the active elements of the relaxation oscillator while the relatively long transitions are occurring. The voltage of the battery is applied to the active elements while the high frequency oscillator is gated on by the low frequency pulses.

In one specific embodiment of the invention, the low frequency oscillator is arranged so the relatively long transitions occur while the low frequency oscillator is changing in a first polarity direction from one of the fixed states to the other of the fixed states. Shorter transitions of the relaxation oscillator occur while the low frequency oscillator is changing in a second polarity direction from the other of the fixed states to the one stated fixed state. In response to a waveform resulting from the first polarity direction transition the current limiting impedance is connected in series between the active elements of the relaxation oscillator. The current limiting impedance is short circuited during the second polarity direction transition so that the active elements are connected across the battery while the second polarity transition is being derived.

The above and still further objects, features and advantages of the present invention will become apparent upon consideration of the following detailed description of one specific embodiment thereof, especially when taken in conjunction with the accompanying drawings.

BRIEF DESCRIPTION OF DRAWING

FIG. 3 is a circuit diagram of each of the inverters included in the apparatus illustrated in FIG. 2; and FIG. 4 is a series of waveforms useful for describing the operation of the circuit illustrated in FIG. 2.

BEST MODE FOR CARRYING OUT THE INVENTION

Figures 1, 2:
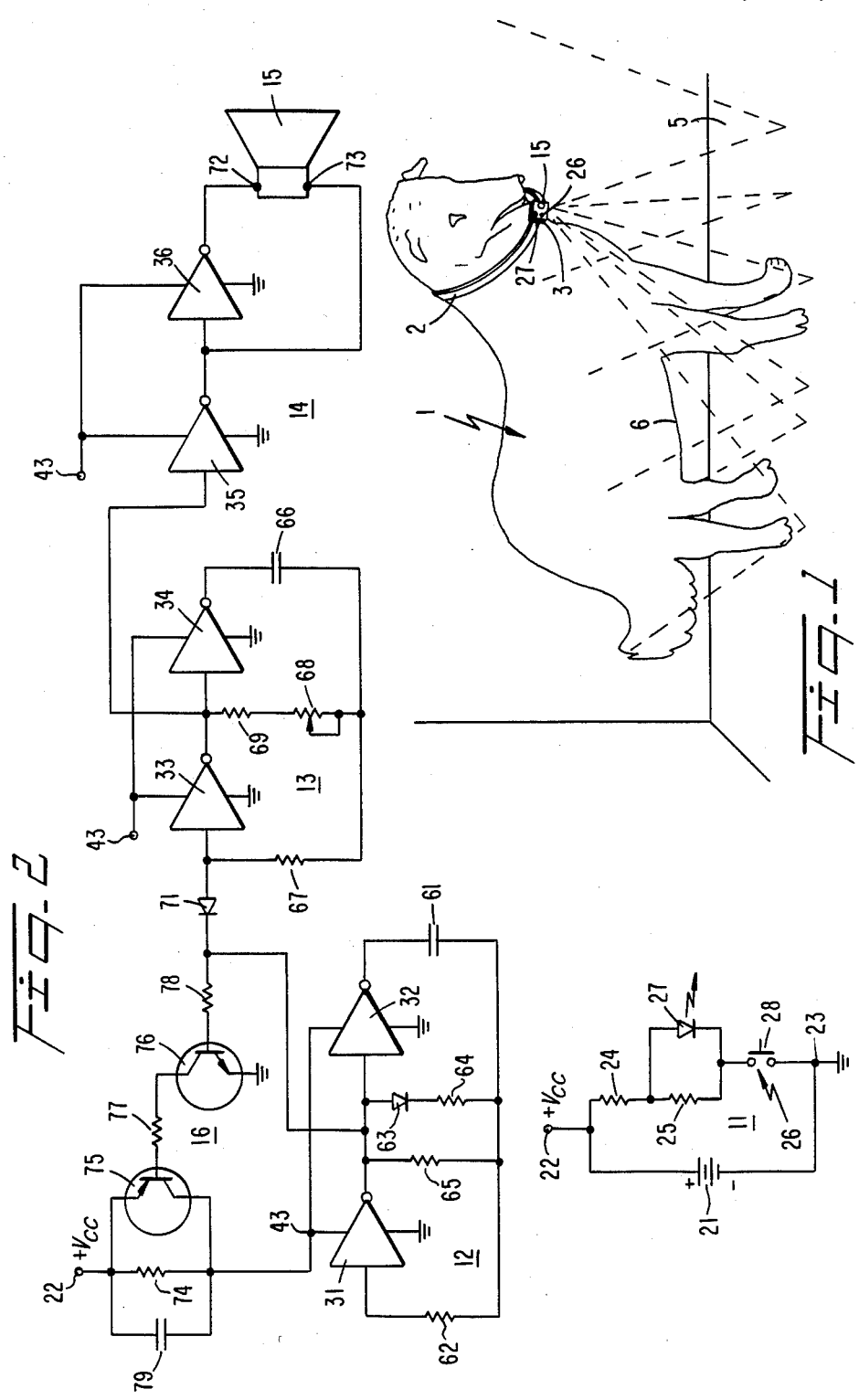
FIG. 1 is an illustration of a dog with an electronic flea repeller in accordance with the present invention.
FIG. 2 is a circuit diagram of the electronic apparatus included in the flea repelling device illustrated in FIG. 1.

Reference is now made to FIG. 1 of the drawing wherein dog 1 is illustrated as including a neck collar 2 on which is mounted case 3. Contained in case 3 are an ultrasonic electric signal to compressional wave transducer 15, in the form of a piezo electric crystal. Transducer 15 is driven by electronic circuitry contained in case 3 and powered by a lithium dry cell battery also contained in the case. Case 3 is placed on collar 2 around the neck of dog 1 so that ultrasonic compressional waves derived from transducer 15 are directed downwardly away from the dog. The ultrasonic compressional waves are directed in a wide angle beam toward surface 5 on which dog 1 is standing, sitting or lying.

The energy in the compressional wave beam derived from transducer 15 is reflected from surface 5 on which dog 1 is standing so that the angle of incidence of the beam impinging on surface 5 is equal to the angle of reflection. Thereby, the ultrasonic compressional wave energy reflected from surface 5 is incident on virtually all of the under parts 6 of dog 1. The specific embodiment described infra provides an effective coverage area having a total length of approximately eight feet, with the center of the area of coverage being approximately directly below case 3. By reflecting the energy of transducer 15 from surface 5, a large coverage area consistent with the under parts of dog 1 is conveniently provided.

The reflected ultrasonic compressional wave energy incident on dog 1 is preferably pulsed at a rate in the audio range of 20 to 300 cycles per second with a relatively low duty cycle of less than 50%, preferably in the range of about 7% to 30%. Each compressional wave pulse derived from transducer 15 has a single ultrasonic frequency, preferably in the 35 KHz-45 KHz range. In tests that have actually been performed it has been found these parameters to be effective in repelling fleas and other similar creatures from a very high percentage of dogs who have had the device within case 3 applied to them.

If the pulse rate is less than about 20 cycles per second, the pest repulsion rate decreases considerably. Also, a pulse rate of less than 20 Hz is not generally perceivable to the human ear to prevent aural techniques from being used to test whether a circuit is operating. The pulsed low duty cycle variations (maximum of about 30%) considerably add to the effectiveness of the device in repelling these objectionable pests relative to continuous wave energy. If the duty cycle drops below about 7%, the pest repulsion effectiveness falls virtually to zero. The low duty cycle also reduces the power requirements for the electronic circuitry in case 3 that drives transducer 15. The 35 KHz-45 KHz frequency range is above the range which can be perceived by the ears of domestic animals, such as dogs and cats, so that the animal is not annoyed by the ultrasonic compressional wave energy emitted by transducer 15. While the power emitted from transducer 15 and reflected back to dog 1 is not adequate to kill the pests on the dog, it is sufficient to repel the pests from the dog. The pests can be killed only if approximately 500 milliamperes are supplied to the electronic circuitry which powers transducer 15. This is not a practical current dissipation level for a portable battery-powered product, such as must be included in case 3, for effective use over a several month period. The specifically illustrated embodiment of the invention has been found through actual use to achieve the stated flea repelling function.

A human can easily perceive whether the electronic circuitry in case 3 is properly operating and whether the batteries energizing the electronic circuit which drives transducer 15 have sufficient power to repel the pests on dog 1. The audio frequency tone derived from transducer 15 can be heard by the vast majority (approximately 85%) of humans if the transducer is placed between 3 and 6 inches from the human ear. Thereby, the vast majority of humans can conveniently detect if the electronic circuitry in case 3 is properly activating transducer 15.

The intensity level of the ultrasonic compressional wave energy derived by transducer 15 is selectively, inferentially determined as being adequate since a light source, in the form of light emitting diode 27, is mounted in case 3. If the batteries powering the electronic circuitry which drives transducer 15 have adequate power to provide the pest repulsion function, light emitting diode 27 is energized when spring biased push button switch 26 on the top face of case 3 is pressed downwardly to a test position from a normal position where the battery power supply in the case is disconnected from the diode. If, however, the batteries do not have adequate energy to provide the repulsion function, activation of switch 26 to the test position does not result in energization of light emitting diode 27 and the human is advised that it is necessary to replace the batteries.

The device described in connection with FIG. 1 is very similar to that described in the previously mentioned copending application. In accordance with the present invention, the electronic circuitry included in case 3 is improved.

Reference is now made to FIG. 2, a circuit diagram of the improved electronic circuitry employed in case 3 of the flea repelling device illustrated in FIG. 1. The device illustrated in FIG. 2 includes battery and battery-life indicating section 11, low frequency, low duty cycle relaxation oscillator 12, gated ultrasonic frequency, relaxation oscillator 13, push-pull driver 14, and electric-ultrasonic compressional wave transducer 15. Connected between the terminals of the battery included in section 11 and active elements in oscillators 12 and 13, as well as driver 14, is network 16 for limiting the current supplied to the active elements during transitions in oscillator 12.

Battery and battery indicator circuit 11 includes single three-volt lithium cell 21 having positive and negative electrodes respectively connected to power supply terminal 22 and ground terminal 23. Lithium cell 21 in the preferred embodiments has a capacity of 250 milliampere hours or 500 milliampere hours; the former and latter capacities respectively enable the batteries to be used in the flea repelling device of the present invention for in excess of six and twelve months.

To monitor the condition of battery 21, terminals 22 and 23 are selectively shunted by series-connected resistors 24 and 25 while normally open circuited spring biased switch 26 is activated to a closed condition. Connected in shunt with resistor 25 is light emitting diode 27. The values of resistors 24 and 25 have a ratio of approximately 1:4 such that when switch 26 is closed, light emitting diode 27 is energized. The circuit including resistors 24 and 25 and light emitting diode 27 is advantageous because it is not component sensitive and does not employ expensive components, such as Zener diodes. Because switch 26 is spring biased, an operator cannot leave the switch in an on condition which drains cell 21. The spring bias is preferably provided by inherent spring properties of the metal forming contact 28.

Each of relaxation oscillator 12, ultrasonic frequency oscillator 13 and driver 14 includes a pair of inverters, so that oscillator 12 includes inverters 31 and 32, oscillator 13 includes inverters 33 and 34 and driver 14 includes inverters 35 and 36. The circuitry included in each of inverters 31-36 is of the silicon gate CMOS-type, as illustrated in FIG. 3. Such an inverter includes input and output terminals 41 and 42, as well as positive and negative DC power supply terminals 43 and 44. In a preferred embodiment, inverters 31-36 are part of a common integrated circuit chip so that all of the inverters have common power supply terminals 43 and 44.

Three parallel branches 45, 46 and 47 are connected between power supply terminals 43 and 44. Branch 45 includes the source drain path of P channel metal oxide semiconductor (CMOS) transistor 48, in turn connected in series with the source drain path of N channel CMOS transistor 49. Gate electrodes of transistors 48 and 49 are connected to input terminal 41. Common junction 51 for the source drain paths of transistors 48 and 49 is connected to the gate electrodes of P and N channel CMOS transistors 52 and 53. Common terminal 54 for the source drain paths of transistors 52 and 53 is connected to the gate electrodes of P and N channel CMOS transistors 55 and 56. The common terminal of the source drain paths of CMOS transistors 55 and 56 is connected to output terminal 42.

As well known, the voltage at output terminal 42 is bi-stable and essentially assumes the voltages at terminals 43 and 44 as a function of the polarity of the input voltage at terminal 41. The binary state of the signal at output terminal 42 is the complement of the binary state of the voltage at input terminal 41. Typically, the voltage at input terminal 41 and the voltage at output terminal 42 vary between the voltages at power supply terminals 43 and 44. While the voltage at terminal 41 is in a binary 1 state, the voltage at output terminal 42 is in a binary 0 state; conversely, a binary 0 at terminal 41 results in a binary 1 at output terminal 42.

While the voltage at terminal 41 is in a fixed binary 1 or 0 state, only leakage current flows through the transistors in branches 45, 46 and 47 between terminals 43 and 44. In response to the voltage at terminal 41 passing through a predetermined amplitude as occurs in a binary state transition for the voltage at input terminal 41, through current (which is a substantial current compared to the leakage current) flows between the source drain paths of the transistors in branches 45, 46 and 47. Current flows through the transistors in each branch because both transistors in each branch are simultaneously forward biased while the input voltage passes through the predetermined amplitude. Thereby, relatively low impedance conduction paths are provided through the transistor source drain paths between terminals 43 and 44. The through current is the greatest while the voltage at terminal 41 is half-way between the voltage between terminals 43 and 44. In response to the voltage at terminal 41 being equal to the voltage at terminal 43 or equal to the voltage at terminal 44, there is no through current and the only current which flows between terminals 43 and 44 is the leakage current of the transistors in the inverter.

In accordance with one aspect of the present invention, the through current in the transistors of inverters 31–36 is substantially attenuated while a relatively slow transition is occurring at the input terminal of inverter 31. Thereby, the amount of energy drawn from cell 21 is substantially reduced and the cell life is increased substantially.

Relaxation oscillator 12, designed to produce periodic pulses having a frequency between 20 and 300 Hz and a duty cycle between 2% and 30%, includes cascaded inverters 31 and 32, each configured as illustrated in FIG. 3. The output terminal of inverter 31 is directly connected to the input terminal of inverter 32. The output terminal of inverter 32 is coupled via capacitor 61 and stabilizing resistor 62 to the input terminal of inverter 31 to form a positive feedback circuit.

A charging path for capacitor 61 is established from the output terminal of inverter 31 to ground via the output terminal of inverter 32 and a branch including the series combination of diode 63 and resistor 64; the branch is shunted by resistor 65, having a much larger value than resistor 64. Charging of capacitor 61 through diode 63 is in response to the DC power supply voltage applied to terminal 43 of inverter 31 through the source drain paths of the P channel transistors included in inverter 31. The charging path is completed through the N channel transistors of inverter 32 to ground.

Capacitor 61 is discharged when inverters 31 and 32 change state so that the output terminal of inverter 32 is at the voltage of power supply terminal 43 and the output terminal of inverter 31 is at ground. During discharge of capacitor 61, current flows from terminal 43 through the capacitor and resistor 65 to ground via the output terminal of inverter 31. Because the resistance in the charging path for capacitor 61 is considerably less than the resistance in the discharge path for the capacitor, the capacitor is charged at a much faster rate than it is discharged. Thereby, relatively long and short duration exponential waveforms are respectively applied to the input terminal of inverter 31 during the discharge and charge cycles of capacitor 61. In response to the exponential waveforms at the input terminal of inverter 31, the inverter derives relatively short duration positive voltage pulses at its output terminal.

Each of the periodic, short duration, i.e., low duty cycle, positive pulses at the output terminal of inverter 31, as occurs while the P channel transistors of inverter 31 are conducting, gates oscillator 13 into a conducting state. During the interval while the output of inverter 31 is at ground potential, i.e., while the N channel transistors of inverter 31 are conducting, oscillator 13 is gated off.

Oscillator 13 is a square wave, ultrasonic frequency, relaxation oscillator, producing pulses having equal duration binary 1 and 0 states; in the preferred embodiment the ultrasonic frequency is approximately 40 KHz.

Inverters 33 and 34 are connected so that the output terminal of inverter 33 is connected directly to the input terminal of inverter 34 and the output terminal of inverter 34 is connected through the series combination of capacitor 66 and stabilizing resistor 67 to the input terminal of inverter 33. Capacitor 66 is basically charged and discharged through the series combination of fixed resistor 68 and variable resistor 69, connected between a common terminal for the output and input of inverters 33 and 34 and a common terminal for capacitor 66 and resistor 67. The values of capacitor 66, resistors 68 and 69 are selected so the oscillator frequency is about 40 KHz. During the half cycles of oscillator 13 while inverters 33 and 34 are energized so that the outputs of inverters 33 and 34 are respectively at the voltages of terminals 43 and ground, capacitor 66 is charged from terminal 43 through the output of inverter 33 and resistors 68 and 69 to ground via the output terminal of inverter 34. During the half-cycles while the outputs of inverters 33 and 34 are respectively at ground and the voltage at terminal 43, capacitor 66 is discharged from the output of inverter 34 through resistors 68 and 69 to ground through output terminal of inverter 33.

Resistors 62 and 67 provide stability for currents fed to the input terminals of inverters 31 and 33. Typically, resistors 62 and 63 respectively have values of 100 kilohms and 200 kilohms to stabilize the magnitude of the currents supplied to inverters 31 and 33. Resistors 62 and 67 stabilize the amplitude of the voltages applied to the input terminals of inverters 31 and 33 so that the oscillation frequencies of oscillators 12 and 13 are predictable from one inverter to another, and are not a function of inverter type or inverter ambient characteristics.

The input terminal of inverter 33 is connected to the output terminal of inverter 31 via diode 71, poled so that the cathode of the diode is connected directly to the output of inverter 31 and the anode of the diode is connected to the input terminal of inverter 33. While the output of inverter 31 is high, during the short duty cycle positive voltage pulse derived by the inverter, diode 71 is back biased to enable oscillator 13 to oscillate at the ultrasonic frequency. During the interval while the output of inverter 31 is low, i.e., at ground, diode 71 is forward biased and the essentially ground voltage at the output terminal of inverter 31 is coupled to the input terminal of inverter 33 via diode 71, to clamp the input of inverter 33 to a voltage that is slightly above ground. Clamping the input of inverter 33 to the voltalge slightly above ground prevents inverters 33 and 34 from changing state, so that the output voltage of inverter 33 is at the voltage of power supply terminal 43.

Thereby, oscillator 13 derives a relatively low duty cycle (between 2% and 30%) envelope, having a pulse repetition rate of between 20 and 300 Hz. During the low duty cycle pulses supplied by oscillator 12 to oscillator 13, oscillator 13 supplies ultrasonic frequency oscillations to driver circuit 14. Oscillator 13 derives 3-volt peak-to-peak high frequency oscillations. Driver 14 converts the 3-volt peak-to-peak variations into 6-volt peak-to-peak variations at opposite electrodes 72 and 73 of transducer 15.

Push-pull driver 14 includes inverter 35, having an input terminal connected to the output terminal of inverter 33. Inverter 35 has an output terminal connected to the input terminal of inverter 36. The output terminals of inverters 35 and 36 are connected to opposite electrodes 72 and 73 of electric-compressional wave transducer 15. Because opposite electrodes 72 and 73 of transducer 15 are connected across the opposite polarity output terminals of inverters 35 and 36, a 6-volt peak-to-peak, 40 KHz voltage is developed across the electrodes with a 2% duty cycle.

The 2% duty cycle excitation of transducer 15 results in the transducer deriving 7% duty cycle compressional waves because: (1) pulses from oscillator 12 immediately instigate the 40 KHz waves from oscillator 13 which in turn almost immediately cause compressional waves to be derived from the transducer, (2) transducer 15 derives compressional wave replicas of the output of oscillator 13 during the pulses from oscillator 12, and (3) compressional waves are derived from the transducer for a substantial duration after oscillator 13 has been turned off by the pulses from oscillator 12. Transducer 15 continues to produce 40 KHz waves after it is no longer being driven by 40 KHz electric waves from oscillator 13 because (1) the transducer is a high Q element mounted in a high Q resonant cavity, as described in the previously mentioned Bianco et al application, and (2) the transducer and cavity have the same resonant frequency as the drive frequency applied to the transducer by oscillator 13 and drive 14.

As indicated supra, during the discharge cycle of capacitor 61 a relatively long time constant exponentially decaying voltage is applied to the input terminal of inverter 31. Because the exponentially decaying voltage applied to the input terminal of inverter 31 has a long time constant, the transistors in inverter 31 have a tendency to remain in a transition state between the voltages at terminals 43 and 44 for a relatively long interval. Thereby, substantial through current has a tendency to flow through the transistors in inverter 31 for a relatively long duration of each cycle of oscillator 13. The substantial, long duration through current in the transistors of inverter 31 has a tendency to decrease the life of lithium battery 21.

In accordance with an important aspect of the present invention, the magnitude of the through current supplied to the transistors in inverter 31 is substantially attenuated during the interval while the relatively long time constant exponentially decaying voltage is applied to the input terminal of inverter 31.

To these ends, resistor 74 is connected in series between terminals 22 and 43 while the longtime constant, exponential waveform is applied to the input terminal of inverter 31. While the relatively short duration pulses are derived at the output terminal of inverter 31, resistor 74 is effectively short circuited to apply the entire voltage of battery 21, across terminals 22 and 23, between terminals 43 and ground; hence, across the source drain paths of the CMOS transistors in inverters 31–36.

Resistor 74 is selectively connected in circuit between terminals 22 and 43 and short circuited by the emitter-collector path of PNP bi-polar transistor 75, having a base DC coupled to the collector of NPN, common emitter bi-polar transistor 76 by resistor 77. The base of transistor 76 is connected through resistor 78 to the output terminal of inverter 31. To suppress transient oscillations occurring in response to the emitter-collector path of transistor 75 being activated into the low and high impedance states, resistor 74 is shunted by smoothing capacitor 79.

In response to the relatively short duration positive pulses at the output of inverter 31, the emitter-collector paths of transistors 75 and 76 are activated into a low impedance state to effectively short circuit resistor 74 and capacitor 79 so that the voltage at terminal 22 is connected directly to power supply terminal 43 of inverters 31–36. While the voltage at the output terminal of inverter 31 is in a relatively low voltage state, transistors 75 and 76 are back biased, so that the voltage at terminal 22 is coupled via resistor 74 to power supply terminal 43. The value of resistor 74 is relatively large, such as 200 kilohms, so that there is substantial, even severe, attenuation of the through current flowing in inverter 31 during the transistion associated with the longtime constant exponential decay of the voltage at the input terminal of inverter 31. In addition, the reduced voltage at terminal 43 reduces, to a certain extent, leakage current through CMOS inverters 32–35 at this time. Because full voltage and current are supplied by terminal 22 to terminal 43 while capacitor 61 is being charged, i.e., while the short duration pulses are derived at the output terminal of inverter 31, maximum power is supplied by battery 21 to transducer 15 at the ultrasonic compressional wave frequency.

To provide a better understanding of the operation of oscillator 12 and the current limiting circuit including resistor 74, reference is now made to the waveforms of FIG. 4. In FIG. 4A is illustrated a rectangular wave having an ON-OFF interval of 1:7, i.e., a duty cycle of approximately 14%. Hence, for approximately 14% of the interval of each cycle at the output terminal of inverter 31, a positive voltage (waveform portion 81), approximately at the voltage of supply 22, is coupled in parallel to the base of transistor 76 and to the cathode of diode 71. During portion 81, oscillator 13 is activated and resistor 74 is short circuited by the emitter-collector path of transistor 75. During the remaining approximately 86% of the waveform of FIG. 4A (waveform portion 82), the voltage at the output terminal of inverter 31 is essentially at ground. During waveform portion 82, oscillator 13 is deactivated and the emitter-collector path of transistor 75 is open circuited so that resistor 74 is in series between terminals 22 and 43, to reduce the voltage at terminal 43.

During waveform portion 81, capacitor 61 is charged via resistors 64 and 65 and exponential waveform segment 83 (FIG. 4B) is applied to input terminal 31. While capacitor 61 is discharged through the relatively large impedance of resistor 65, exponential waveform segment 84 (FIG. 4B) is coupled to the input terminal of inverter 81. Substantial through current starts to flow through the P and N channels of the transistors in inverter 31 approximately at time $T_1$ and lasts until negative-going transition 85 occurs, at time $T_2$. The duration between times $T_1$ and $T_2$ is typically about one-third of the length of longtime constant segment 84. Hence, there is a tendency for through current to flow through inverter 31 for a substantial portion of each operating cycle of oscillator 12. However, because resistor 74 is connected between terminals 22 and 43 while waveform segment 84 is being derived, the magnitude of the through current between times $T_1$ and $T_2$ is severely attenuated and does not particularly adversely effect the life of battery 21.

During waveform segment 83, while capacitor 61 is being charged, through current in inverter 31 flows from time $T_3$ to time $T_4$, when positive-going steep transition 86 occurs. Time $T_3$ occurs when the voltage at the input terminal of inverter 31 is equal to the voltage at the input of the inverter at time $T_2$, while transition 86 occurs when the voltage at the input of inverter 31 is equal to the voltage at the input of the inverter at time $T_1$. The duration of the interval between times $T_3$ and $T_4$ is approximately one-third of the duration of waveform segment 83. Because waveform segment 83 is considerably shorter than waveform segment 84, the amount of energy supplied by battery 21 to inverter 13 is relatively low. This enables full current and voltage to be applied by battery 21 to terminal 43 while transducer is driven at the ultrasonic frequency without having an excessively detrimental effect on the life of battery 21.

While there has been described and illustrated one specific embodiment of the invention, it will be clear that variations in the details of the embodiment specifically illustrated and described may be made without departing from the true spirit and scope of the invention as defined in the appended claims.

We claim:

1. Apparatus for periodically supplying a pulsating waveform to a load from a low energy battery comprising a relaxation oscillator for deriving the electric pulses, the oscillator including a pair of inverters connected in a feedback circuit including resistor and capacitor means so that exponential charge and discharge voltage waveforms are applied to an input of one of the inverters, said one inverter including a pair of complementary transistors having source drain paths connected in series with terminals of the battery, the transistors including gate electrodes responsive to the exponential waveforms so that in response to the exponential voltage waveform being in a predetermined range between minimum and maximum values of the battery voltage both transistors are simultaneously forward biased and there is a tendency for substantial current to flow through both source drain paths, a sudden transition in the output of the one inverter occurring in response to the exponential waveforms passing through the predetermined range, and means responsive to the output of the one inverter for connecting a current limiting impedance in series with the source drain paths and the power supply terminals at the time the substantial current has a tendency to flow to substantially attenuate the magnitude of the substantial current without substantially affecting derivation of the sudden transition, the sudden transition being substantially replicated in the pulsating waveform.

2. The apparatus of claim 1 wherein the resistor and capacitor means includes a capacitor and a stabilizing resistor series connected between an input terminal of said one inverter and an output terminal of the other inverter, the stabilizing resistor and capacitor being respectively connected to input and output terminals of the first and other inverters, another resistor having a first terminal connected between the capacitor and stabilizing resistor and a second terminal connected between the output terminal of the one inverter and the input terminal of the other, inverter.

3. A flea repelling device comprising a relaxation oscillator for deriving pulses having a predetermined duty cycle and a predetermined frequency, a gated oscillator responsive to the pulses for deriving electrical oscillations in the ultrasonic frequency range, an electric to compressional wave transducer connected to be responsive to the electrical oscillations, the duty cycle, pulse frequency and ultrasonic frequency being such that compressional wave pulse envelopes at the ultrasonic frequency derived from the transducer incident on fleas in the vicinity of the transducer repel the fleas, a battery for powering the relaxation oscillator and gated oscillator, active elements in the relaxation oscillator and gated oscillator drawing substantial current from the battery only while undergoing state transitions, and means responsive to pulses derived by the relaxation oscillation for connecting a current limiting impedance in series with the active elements and the electrodes of the battery while transistions in the relaxation oscillation occur to substantially attenuate the magnitude of the current drawn by the active elements during the transitions.

4. The flea repelling device of claim 3 further including a driver powered by the battery for coupling the ultrasonic electrical oscillations to the transducer.

5. The flea repelling device of claim 4 wherein the driver includes active elements drawing substantial current from the battery only while undergoing state transitions.

6. The flea repelling device of claim 4 wherein each of the relaxation oscillator, gated oscillator and driver includes a pair of inverters, each of the inverters including a pair of complementary metal oxide semiconductor transistors having source drain paths connected in series with terminals of the battery, the transistors including gate electrodes responsive to the voltage at input terminals of the inverter so that in response to the inverter input voltage being in a predetermined range between minimum and maximum values of the battery voltage both transistors are simultaneously forward biased and there is a tendency for substantial current to flow through both source drain paths, a sudden transition in the output of the one inverter occurring in response to the voltage at the inverter input terminals passing through the predetermined range.

7. The flea repelling device of claim 6 wherein each of the oscillators includes resistor and capacitor means connected in a feedback circuit with the inverters of the oscillator.

8. The flea repelling device of claim 7 wherein the resistor and capacitor means includes a capacitor and a stabilizing resistor series connected between an input terminal of said one inverter and an output terminal of the other inverter, the stabilizing resistor and capacitor being respectively connected to input and output terminals of the first and other inverters, another resistor having a first and second terminal connected between the capacitor and stabilizing resistor and a second terminal between the output terminal of the one inverter and the input terminal of the other inverter.

9. The flea repelling device of claim 4 wherein the driver includes first and second inverters connected so an output terminal of the first inverter is connected to an input terminal of the second inverter and to one electrode of the transducer and an output terminal of the second inverter is connected to another electrode of the transducer.

10. The flea repelling device of claim 3 wherein the relaxation oscillator includes a pair of inverters connected in a feedback circuit including resistor and capacitor means so that exponential charge and discharge voltage waveforms are applied to an input of one of the inverters, said one inverter including a pair of complementary metal oxide semiconductor transistors having source drain paths connected in series with terminals of the battery, the transistors including gate electrodes responsive to the exponential waveforms so that in response to the exponential voltage waveform being in a predetermined range between minimum and maximum values of the battery voltage both transistors are simultaneously forward biased and there is a tendency for substantial current to flow through both source drain paths, a sudden transition in the output of the one inverter occurring in response to the exponential waveforms passing through the predetermined range.

11. The flea repelling device of claim 10 wherein the resistor and capacitor means includes a capacitor and a stabilizing resistor series connected between an input terminal of said one inverter and an output terminal of the other inverter, the stabilizing resistor and capacitor being respectively connected to input and output terminals of the first and other inverters, another resistor having a first terminal connected between the capacitor and stabilizing resistor and a second terminal connected between the output terminal of the one inverter and the input terminal of the other inverter.

12. Apparatus for deriving periodic pulses each including high frequency oscillations comprising a low energy battery, a low frequency relaxation oscillator powered by the battery for deriving the periodic pulses, the periodic pulses having a duty cycle of substantially less than 50%, a gated oscillator powered by the battery responsive to the pulses for deriving the high frequency oscillations only while the pulses are being derived, the relaxation and gated oscillators including active elements having a low impedance for current from the battery during transitions between high and low fixed states thereof and having a high impedance for current from the battery while in the high and low fixed states thereof, said relaxation and gated oscillators respectively changing states at the low and high frequencies, the relaxation and gated oscillators being arranged so that transitions between fixed states of the low frequency oscillator are relatively long and transitions between the fixed states of the high frequency oscillator are relatively short, means responsive to a waveform of the relaxation oscillator for connecting a current limiting impedance between the battery and the active elements of the relaxation oscillator while the relatively long transitions in the active elements of the relaxation oscillator are occurring and for applying the voltage of the battery to the active elements while the high frequency oscillator is gated on by the pulses.

13. The apparatus of claim 12 wherein the relaxation oscillator is arranged so the relatively long transitions occur while the low frequency oscillator is changing in a first polarity direction from one of said fixed states to the other of said fixed states, shorter transitions of the relaxation oscillator occurring while the low frequency oscillator is changing in a second direction from the other of said fixed states to said one fixed state, the connecting means including means responsive to a waveform resulting from said first polarity direction transition for connecting the current limiting impedance in series between the active elements of the relaxation oscillator, the connecting means being unresponsive to said second polarity direction transition so that the current limiting impedance is effectively decoupled from the active elements and the active elements are connected across the battery while the second polarity transition is being derived.

14. The apparatus of claim 12 wherein the means for connecting the current limiting impedance includes a resistor connected between electrodes of the battery and power supply terminals of the oscillator, a transistor having a controlled path having high and low impedances responsive to a signal coupled to a control electrode thereof, the control electrode being responsive to the pulses so the path has a high impedance during the pulses and a low impedance between the pulses, the resistor being connected in shunt with the path.

15. The apparatus of claim 12 wherein the relaxation oscillator includes a pair of inverters connected in a feedback circuit including resistor and capacitor means so that exponential charge and discharge voltage waveforms are applied to an input of one of the inverters, said one inverter including a pair of complementary transistors having source drain paths connected in series with terminals of the battery, the transistors including gate electrodes responsive to the exponential waveforms so that in response to the exponential voltage waveform being in a predetermined range between minimum and maximum values of the battery voltage both transistors are simultaneously forward biased and there is a tendency for substantial current to flow through both source drain paths, a sudden transition in the output of the one inverter occurring in response to the exponential waveforms passing through the predetermined range.

16. The apparatus of claim 15 wherein the resistor and capacitor means includes a capacitor and a stabilizing resistor series connected between an input terminal of said one inverter and an output terminal of the other inverter, the stabilizing resistor and capacitor being respectively connected to input and output terminals of the first and other inverters, another resistor having a first terminal connected between the capacitor and stabilizing resistor and a second terminal connected between the output terminal of the one inverter and the input terminal of the other inverter.

17. The apparatus of claim 12 wherein each of the oscillators includes a pair of inverters and resistor and capacitor means connected in a feedback circuit with the inverters.

18. The apparatus of claim 17 wherein the resistor and capacitor means of each oscillator includes a capacitor and a stabilizing resistor series connected between an input terminal of said one inverter and an output terminal of the other inverter, the stabilizing resistor and capacitor being respectively connected to input and output terminals of the first and other inverters, another resistor having a first terminal connected between the capacitor and stabilizing resistor and a second terminal connected between the output terminal of the one inverter and the input terminal of the other inverter.

* * * * *